US010096064B2

(12) United States Patent
Vroom et al.

(10) Patent No.: US 10,096,064 B2
(45) Date of Patent: Oct. 9, 2018

(54) METHOD AND SYSTEM FOR SOURCE DOCUMENT DATA ENTRY AND FORM ASSOCIATION

(75) Inventors: Brian D. Vroom, Ann Arbor, MI (US); Jonathan Baron, Dexter, MI (US); Fred Leicher, Ann Arbor, MI (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 215 days.

(21) Appl. No.: 12/590,461

(22) Filed: Nov. 6, 2009

(65) Prior Publication Data
US 2010/0161460 A1    Jun. 24, 2010

Related U.S. Application Data

(60) Provisional application No. 61/198,642, filed on Nov. 6, 2008.

(51) Int. Cl.
| G06K 9/54 | (2006.01) |
| G06F 17/24 | (2006.01) |
| G06Q 40/02 | (2012.01) |
| G06Q 40/00 | (2012.01) |

(52) U.S. Cl.
CPC .......... *G06Q 40/02* (2013.01); *G06Q 40/123* (2013.12)

(58) Field of Classification Search
CPC ............... G06Q 40/123; G06F 17/243; G06F 17/30011
USPC ...................................................... 705/1, 31
See application file for complete search history.

(56) References Cited

U.S. PATENT DOCUMENTS

| 7,117,208 B2 | 10/2006 | Tamayo et al. |
| 7,117,215 B1* | 10/2006 | Kanchwalla ...... G06F 17/30592 707/602 |
| 7,296,217 B1* | 11/2007 | Earnshaw ............. G06Q 10/10 705/317 |
| 7,296,221 B1 | 11/2007 | Treibach-Heck et al. |
| 7,346,600 B2 | 3/2008 | Nakao |
| 7,548,885 B2* | 6/2009 | Dutta ..................... G06Q 20/04 705/31 |
| 2003/0036912 A1* | 2/2003 | Sobotta ................. G06F 17/243 705/31 |
| 2004/0148519 A1* | 7/2004 | Graves .................... H04L 9/088 726/5 |
| 2005/0004885 A1* | 1/2005 | Pandian ............ G06F 17/30557 |
| 2006/0155618 A1* | 7/2006 | Wyle .................... G06F 17/243 705/31 |
| 2007/0176000 A1* | 8/2007 | Cattrone ................ G06K 1/121 235/462.01 |
| 2007/0185835 A1* | 8/2007 | Ursitti ............... G06F 17/30616 |

(Continued)

*Primary Examiner* — Talia F Crawley
(74) *Attorney, Agent, or Firm* — Duncan Galloway Egan Greenwald, PLLC; Kevin T. Duncan

(57) ABSTRACT

The present invention provides software and a method and system of efficient source document data entry and data association. More particularly, the present invention relates to a software module which receives source documents and recognizes or extracts information from the documents or associated files for use in populating fields of related or derivative documents or screens to facilitate accurate transfer of data. The invention also allows for ease in confirming the accuracy of the extracted or imported data by comparison with the source document either directly by a person or through automated or semi-automated procedures.

28 Claims, 6 Drawing Sheets

(56) References Cited

U.S. PATENT DOCUMENTS

| | | | | |
|---|---|---|---|---|
| 2007/0237427 | A1* | 10/2007 | Patel | G06K 9/00442 382/305 |
| 2008/0212901 | A1* | 9/2008 | Castiglia | G06K 9/033 382/311 |
| 2008/0300900 | A1* | 12/2008 | Demarest | G06F 17/30306 705/1.1 |
| 2008/0301084 | A1* | 12/2008 | Demarest | G06F 17/30011 |

* cited by examiner

METHOD AND SYSTEM FOR SOURCE DOCUMENT DATA ENTRY AND FORM ASSOCIATION

CROSS-REFERENCE TO RELATED APPLICATIONS

The present invention relates and claims benefit of priority to U.S. Provisional Patent Application No. 61/198,642, filed Nov. 6, 2008, and entitled METHOD AND SYSTEM FOR SOURCE DOCUMENT DATA ENTRY AND FORM ASSOCIATION, the entirety of which is hereby incorporated by reference.

BACKGROUND OF THE INVENTION (a) Field of the Invention

The present invention relates to software and systems for receiving and processing source documents, e.g., completed or partially completed documents from a source, e.g., a client, such as a taxpayer, of a professional service provider, such as an accountant. More particularly, the invention relates to processes that transfer data from source or originating documents for use in calculations, bookkeeping functions, and preparing forms and documents, e.g., tax return and associated schedules and attachments.

(b) Background of the Invention

Computers and the software executed on them are increasingly useful and reliable tools in streamlining business processes, including those processes associated with professional service providers such as accountants, tax preparers and attorneys. The task of collecting, inputting and confirming client data, such as tax related date, is time-consuming and, while requiring great attention to detail, tedious. Also, data collected from one form may be used in other forms. Presently, data is largely independently input into the separate forms. While there is known OCR (optical character recognition) techniques and formats, including for example .pdf, what is needed is a system and method to recognize the data extracted using OCR techniques and associate the extracted data with particular entities, e.g., clients, and/or particular types or fields of information, for example fields or locations of a form, such as various tax related forms, e.g., W-2, 1098, 1099.

Providing a means for ensuring accuracy of source and derivative documents and data collected from source documents is a critical function to the effective and efficient delivery of services and work product. This is especially critical in connection with preparing important documents, such as financial documents for clients, by organizations such as professional services entities, like accounting and law professionals. Effective adherence to accounting safeguards to ensure the accuracy of data reported to tax authorities, such as the IRS, is a longstanding need. However, this need is balanced against the need to be efficient in performing tasks for clients and in today's employment shortage of persons equipped to handle this sort of task at a reasonable hourly or billing rate. Current methods of data entry involve manual viewing of source documents from which data is recognized by a user and separately entered by the user into a form or database and/or identified as a particular type or field of data. In this process a peer reviewer may acquire the documents and review them before confirming that the data entered into a database or derivative document accurately reflects the data derived from the source documents manually entered by the user.

Products for converting "hard" documents into "soft" electronic form(s) or imaged documents, such as scanners, and software for extracting or reading data from such imaged documents, e.g., ScanSoft and Adobe Acrobat™, exist but are limited. There also exist products, such as Thomson Reuters Corporation's CS Professional Suite of software products, including Practice CS™, UltraTax CS™, Accountant's Gateway™ and FileCabinet CS™, each of which may be integrated together and with other applications, such as Microsoft® Office suite of products. Such systems may be used to translate, read and transmit data across a computer network from computer station to station. In particular, such applications allow users within a professional services firm, e.g., an accounting firm, to share information and documents with client computer systems and users and other third parties.

What is needed is a method and system for effectively bridging the divide between source documentation and the entry and collection of data for use in work product, submissions, filings, data processing systems, databases, and other end and intermediate purposes. In particular, a system is needed for accurately collecting tax related information from source documents and accurately entering such data in a usable fashion into systems, such as tax preparation systems, for completing and preparing tax submissions such as income tax returns.

SUMMARY OF THE INVENTION

The present invention provides a method and system for Source Document Data Entry (SDDE) and is directed to providing professional service providers and users with a system and method to receive documents and through which relevant information, such as client-specific tax related data, may be extracted, verified, saved and/or further processed. For instance, the invention may be used to store extracted data in databases for further use and processing or to incorporate the data directly into forms or other documents, such as tax returns, schedules and other filings. The system may be in whole or in part automated and includes a process for reviewing generated forms or documents pre-populated with extracted client data for accuracy. In this manner, users may check for potential errors, inconsistencies or discrepancies in the extracted and identified data. Exemplary organizations that are expected to use SDDE include firms providing products and services in the areas of accountancy, tax preparation, finance, law, insurance and consultancy. However, the tools of the present invention may be used in many environments and the invention is not limited to the professional groups discussed herein. The invention may be used in conjunction with internet or other network-based products.

In one embodiment, the SDDE may utilize Thomson Reuter Corporation's FileCabinet CS, which is an electronic document management product used by tax and accounting professionals and may be, for example, integrated with Thomson Reuter Corporation's UltraTax CS product, for document processing and handling. In particular, FileCabinet CS may be used to organize, store, and archive client-generated as well as professional-generated, documents. FileCabinet CS, for example, includes an OCR capability to extract text and other data from image files or documents. Additionally, the solution may include an "understanding" of form layout or theme so as to enable recognition of external text and other data, based on spatial location on the form, for example, as being certain types of fields or information. For example, government forms, such as IRS tax forms, have a defined layout and set fields located thereon. Accordingly, if the system recognizes or is informed, such as by a user, that a document received for processing is a certain type of form, e.g., W-2, then it can be configured to associate data extracted from the form with particular types of data based on location of the extracted data on the form. Once data is extracted and associated or identified as a particular type of data, then it may be used for a multitude of purposes, e.g., calculations, populating fields in other documents, etc. Additionally, a user, such as a clerical or staff person or para-professional, may review the extraction and association process to confirm or verify accuracy or identify potential errors, discrepancies or inconsistencies in extracted data. This is a significant improvement from having to manually enter data from document-to-database or document-to-document. The source documents as well as derivative documents may then be accessed for further processing, editing, distribution, filing, review, etc.

The SDDE receives, processes, and/or stores a set of source documents and in one embodiment extracts data from source documents and includes a database for storing extracted client data and an electronic folder filing system, or e-folders. Source documents may be organized into predefined, self-defined or user-defined e-folders and may be associated with a given audit, project, or client, for example. Alternatively, source documents may be constructively placed into such e-folders through the use of placeholder files known as kernel pointers, or shortcuts which when engaged directly or indirectly will retrieve the actual file for use. Similarly, source documents may be constructively placed into an e-folder through the use of associated tags.

In one embodiment, the SDDE may provide clients with remote access to source documents, derivative documents and/or data records, such as by accessing e-folders through a secure web portal, i.e., UltraTax portal. The e-folders may be configured to provide professional service providers and users or clients with tools to track and efficiently manage source documents associated with a project. E-folders provide improved management and organization of files and documents for users, such as partners, supervisors, employees, reviewers, clients and others. In this manner documents, including source documents, client data and forms are effectively and efficiently shared in a secure manner along a network connection.

In one embodiment, the SDDE comprises a software application, a database, and a plurality of computers. The present invention is intended to be used in the organization of source documents for use by an employee in the preparation of assigned projects, such as the collection of data and then preparation of work product, e.g., tax returns and forms. Source documents relevant to a project can be received by an employer or employee via hardcopy or electronic copy submitted by the client or other party, such as an employer or financial institution. The electronic copy of any source document may be received through the use of e-mail, facsimile, or via an electronic portal service such as, for example, Thomson Reuter Corporation's NetClient and UltraTax portal. Source documents received as hardcopy from a client may be converted into electronic or "soft" copy via electronically scanning such source documents into a computer and converting them into a desired format such as a portable source document format (.pdf), a word processor format (.doc, .wpd), a tagged image file format (.tiff), a hypertext markup language (.html), a simple text format (.txt), a rich text format (.rft), or any other such computer-readable electronic format. The SDDE or ancillary services may extract data/text from source documents. Electronic source documents received may be stored within a database from which extracted data or records may be retrieved by users having access to the database. The information in the database is capable of being processed and synthesized by the SDDE software application into useful information in the form of fields which can be viewed within a derived document or report. The user can then look at the data stored within a source document generated by the application software and database to review the information contained therein.

The SDDE system allows the user to input tax form data using the e-folder source documents stored within the database associated therewith. The SDDE provides an interface between the user and the functional software which compiles and processes the information. The interface of the SDDE allows the user to input information and group data from the e-folders such that the source documents within the e-folders can become associated with distinct and particularized portions of the form or source document being prepared in response to the assigned project, such as, for example, audit report or tax return. At the interface of the SDDE, the user may simply input the information collected from the source documents stored within the e-folders by using an interface having the appearance of an IRS form, such as, for example, a standard paper format used by non-professionals. The benefit of such a method provides that the information may be "pushed" to a clerical staff person or para-professional to input the data rather than requiring an accountant, lawyer or other professional, supervisor or employee to input such information.

Alternatively, an optical character recognition ("OCR") capability may be provided, wherein the user may associate particular source documents with particular parts of a form, and the computer reads the text out of the source documents within the e-folder and formats the data into a form required for the particularized project, such as, or example, an audit report. The OCR acts directly upon the source documents within the e-folder and is capable of analyzing the information contained therein and extracting such information for storing in a database or processing by a computer. The extracted information may be transmitted using secure digital data equipment modules. SDDE software analyzes and processes the extracted information and may generate derivative documents by matching extracted information with corresponding fields within one or more forms as required by a given project, such as, for example, a W2, 1098, 1099 or audit report form. The SDDE software may associate or format the extracted data with respective fields or records of a database to be retrieved later to populate fields of a form document.

The SDDE software may provide a mapping component that functions as a system for mapping areas or portions of source documents to certain fields within a database or form. For example, tick marks or source document positioning may be used for mapping previously identified and standard relevant information, such as, for example, data provided within a first line of submitted source documents is to be placed in field 1 (e.g., name), whereas data provided within a second line of a submitted source document is to be placed in field 2 (e.g., address), and so on.

In one exemplary embodiment the invention provides a computer-implemented method for collecting and entering data from a source document, the method comprising: collecting electronic source data associated with a source document; associating collected source data with a field of an electronic form; and generating a client-specific document by populating at least one field of the electronic form with collected source data associated with that field in the associating step. The embodiment may further include: associating the source document with the client-specific document; wherein the client-specific document is one of a group consisting of a tax return, a tax return-related schedule, a tax related attachment, and a quarterly payment document; finalizing the client-specific document and submitting the client-specific document to a tax authority; wherein the collecting step comprises extracting source data from the source document; comparing the source document with the collected source data to confirm the accuracy of the collected source data; wherein the comparing step is used to confirm the accuracy of fields of the client-specific document populated with collected source data; wherein the source document is one of a group consisting of: W-2 type tax forms; 1098 type tax forms; 1099 type tax forms; 1120 type tax forms; 2439 type tax forms; IRS issued tax related schedules and forms; and state or local issued tax related forms; storing the collected source data and a set of electronic forms in a database; and generating the client-specific document by populating a set of fields within the electronic form with a set of collected source data; determining based on the location of the collected source data on the source document which fields to respectively associate with the collected source data; assigning a set of field type reference data based on location of a set of fields on a standard form issued by a tax authority, wherein the associating step comprises associating a set of collected source data with the set of field type reference data; organizing at least one of the collected electronic data, the source document, and the associated documents into an electronic folder and associating the folder with the said project; presenting the client-specific form to a user for review.

In another exemplary embodiment the invention provides a computer-based system for collecting and entering data from a source document into an electronic form document, the system comprising: a computer having a memory, storage and a processor for executing source document data entry software to generate a client-specific document, the software comprising: code adapted to extract electronic source data from a source document; code adapted to associate collected source data with one or more fields comprising an electronic form document; code adapted to generate a client-specific document by populating at least one field of the electronic document with the collected source data associated with the field. The implementation may also include: wherein the software further comprises code adapted to associate the source document with the client-specific document; wherein the client-specific document is one of a group consisting of a tax return, a tax return related schedule, a tax related attachment, and a quarterly payment document; wherein the system further comprises an electronic filing module adapted to file the client-specific document with a tax authority; wherein the software further comprises code adapted to extract source data from the source document; automatically comparing the source document with the collected source data to determine accuracy; automatically comparing the collected source data with the client-specific document to determine accuracy; wherein the source document is one of a group consisting of: W-2 type tax forms; 1098 type tax forms; 1099 type tax forms; 1120 type tax forms; 2493 type tax forms; IRS issued tax related schedules and forms; and state or local issued tax related forms; a database for storing the collected source data and a set electronic forms, wherein each of the set of electronic forms comprises a set of fields and the client-specific document is generated by populating a set of fields associated with an electronic form with a set of the collected source data; code adapted to determine based on the location of the collected source data on the source document which fields to respectively associate with the collected source data; code adapted to assign a set of field type reference data based on location of a set of fields on a standard form issued by a tax authority, and code adapted to associate a set of collected source data with the set of field type reference data; an electronic folder associated with a project for organizing at least one of: the collected source data, the source document, and the client-specific document; a GUI adapted to present to a user the collected source data and to allow editing of the collected source data to correct errors, inconsistencies or omissions.

BRIEF DESCRIPTION OF THE DRAWINGS

A better understanding of the present invention will be had upon reference to the following description in conjunction with the accompanying drawings. These drawings should not be construed as limiting the present invention, but are intended to be exemplary and for reference, wherein:

FIG. 4 shows a source data entry interface;

FIG. 6 shows data collected from a source document enabled for inputting into the source data entry interface.

DETAILED DESCRIPTION OF THE PREFERRED EMBODIMENT

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
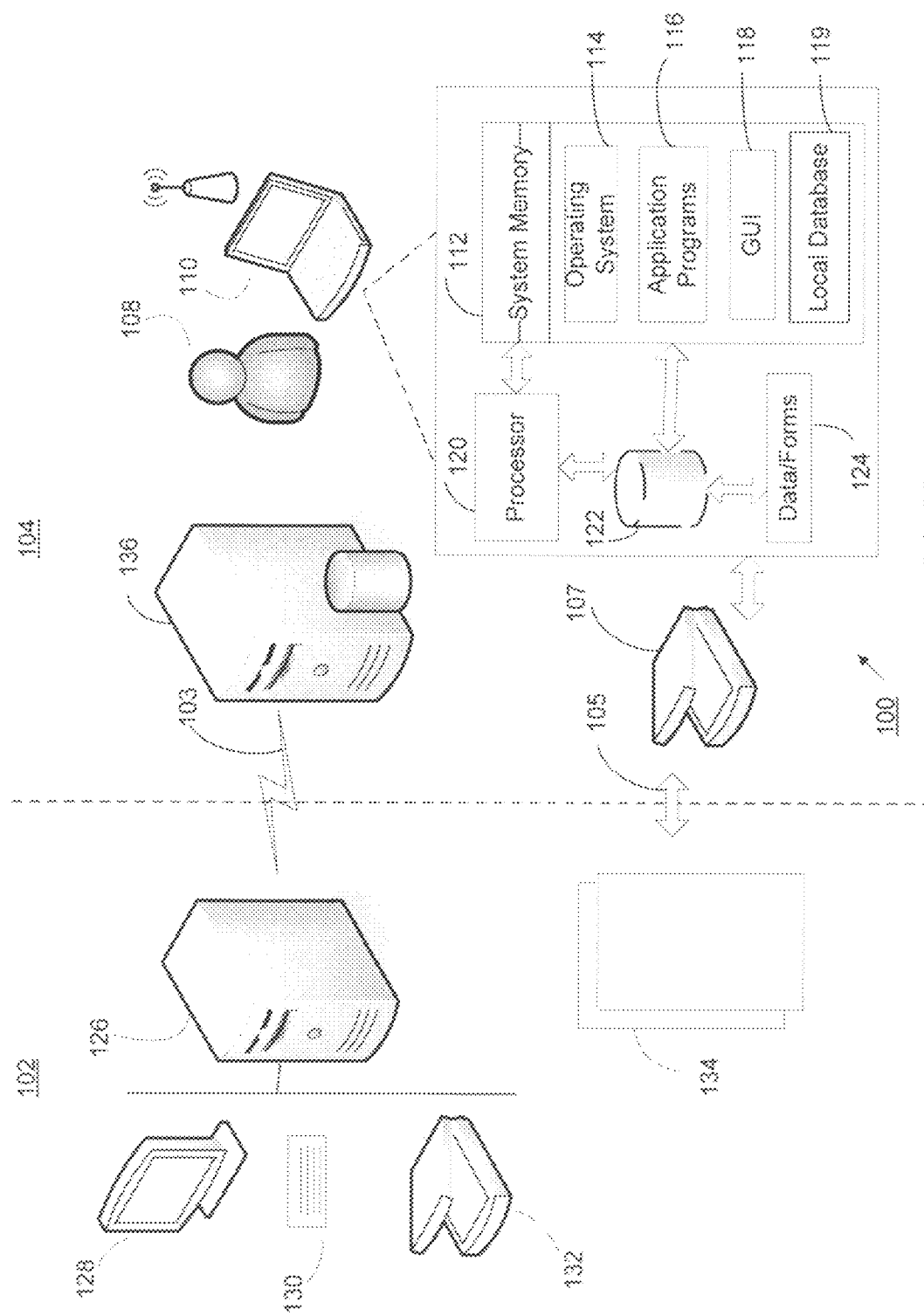
FIG. 1 shows the system of the present invention.

Referring now to FIG. 1, a system 100 is shown for implementing a method and system for receiving and processing documents ("source documents"), either in hard or soft form, and for extracting information therefrom for further use. For instance, data may be extracted from the source documents and used to prepare or populate other forms ("derivative forms"). The system 100 comprises a client side 102 and a professional service provider side 104. In this example, a user 108, such as a professional preparing a tax return or conducting an audit, may use a mobile or local device, such as a wireless-enabled notebook computer 110 to connect to the server 136 via a communication link. This configuration is one of many and is not limiting as to the invention. For example, in one alternative configuration user 108 may use the application fully self-contained within a desktop environment and may utilize a local or remote database, such as SQL 2005 or above or SQL Express or other suitable database. Remote as used herein does not necessarily relate to spatial separation or distance, but simply to a non-direct connection or linkage and includes connections over networks regardless of spatial separation. The communication links may be a combination of wireless, LAN, WLAN, ISDN, X.25, DSL, and ATM type networks, for example.

The user notebook 110 or desktop computer may comprise a typical combination of hardware and software including system memory 112, operating system 114, application programs 116, graphical user interface (GUI) 118, processor 120, and storage 122 which may contain electronic information 124 such as forms, practice aids, titles, data, procedures and the like. The operating system 114 shall be suitable for use with the professional practice functionality described herein, for example, Microsoft Windows Vista (business, enterprise and ultimate editions), Windows 2000 with SP4 or Windows XP Professional with SP2. Also, the SDDE system may be browser-based and/or may include custom integration with Microsoft Office applications, e.g., Outlook, Word and Excel. Application programs 116 may include, for example, Microsoft Office 2007, Office XP with SP2, or Office 2003 with SP1 applications. The software and related tools, procedures, forms and data used to implement the risk assessment processes may be accessed by the machine 110 via the Internet or it may be loaded onto the machine via CD-ROM or other media or a combination of such means. The system requirements in one embodiment may require the machine 110 to be compatible with minimum threshold levels of processing capabilities, e.g., Intel Pentium III, speed, e.g., 500 MHz, and other parameters.

For purposes of discussion, an exemplary client side 102 may comprise a computer or server 126, user interface peripherals such as drives (not shown), monitor 128, keyboard 130, and scanner 132. The computer 126 may be used to communicate remotely or locally with the server 136 of professional system 104 and may load, pass, and/or receive information and instructions, such as electronic documents, data, forms, and the like for storing and processing locally by the user 108 on machine 110. A communication link 103 may be established between client side 102 and professional facility 104 for loading and updating documents, data and software used by the user during tax preparation or auditing processes, for example. This exchange may also represent a point of service delivery location, e.g., where "client" system 102 is a local office of a tax preparer, with a client present or not, and service system 104 represents a back-office or central processing facility 104. Alternatively, hard documents 134 may be provided from the client to the professional at point of delivery or transfer or exchange 105 and the professional facility 104 may process the documents 134 such as be scanning using scanner 107 and manipulation via software resident at 116. Other devices or methods may be used to provide documents, hard or soft, to the professional either directly from the client 102 or from a third-party, such as a financial institution, bank, state, federal or local government entity, taxing authority, etc. The professional facility 104 may be associated with a professional services company, such as an accounting firm, in the business of preparing tax returns or in conducting audits.

The professional services facility 104 may include a network of computers, such as connected over a LAN, WLAN, Ethernet, token ring, FDDI ring or other communications network infrastructure. The facility 104 may also include a separate local or remote database or other data storage component(s). In one exemplary use of the SDDE system, a user 108 may prepare a tax return or other filing or document for a client 102. Client 102 may provide the professional service provider 104 with source document(s) 134 in either hard or soft form. If in hard form, a scanner 107 may be used to convert the hard copy document into a soft copy format and/or for text/data extraction, such as through an optical character recognition OCR process. The source document received in or converted to electronic form, for example in pdf, tif, gif, jpeg, bit-map or HTML format, may be delivered to professional service server/computer 136, a database associated with the system 104 and/or computer 110 for processing. Server 136 or computer 110 may include software, such as Thomson Reuters Corporation's FileCabinet CS, adapted to perform operations on the electronic document such as text/data extraction. Essentially, the SDDE system preferably includes software or processes that will allow conversion of a physical embodiment of a document into an electronic representation of the document and then extract through recognition intelligent information from the electronic representation. This preferably includes a platform to assign or recognize by location or geometric shape or the like fields of data. Preferably, the SDDE system can locate, recognize and extract various data fields on imaged forms—source documents.

In addition to image capture and OCR and any other types of marking recognition operations, the SDDE system may include software applications 116 capable of recognizing form layout, identified shapes, and data or field recognition. For example, the software may recognize that data extracted from a certain area or location on the source document, such as by using a template discussed hereinbelow, is a particular piece of information, e.g., name, address, income amount, tax amount, particular type of deduction, tax paid, etc. In addition, software may include the capability of comparing the extracted and associated data with sample or comparative data to check for in range compatibility or other format compatibility expected with the data as associated by the SDDE system. For example, if the data extracted from the source document is assigned as a "name" type data, then the system can check to confirm that the data comprises alpha-type characters rather than numeric-type characters, and vice-versa for data expected to be numeric-type characters. In addition, if the numeric data extracted is out of range of valid amounts for a given field or data-type, then the SDDE system can alert the user 108 that a field is believed to be invalid and is in need of confirmation by the user. Also, the SDDE system, either automatically or manually through the user or other operator, may utilize information such as client email address, social security number, identification number, etc, to identify the client and associate the source document, and derivative documents and data records, with that client. The data extracted and associated with a client may then be used for other purposes and reformatted for use in other processes, e.g., in spreadsheet, Quick Books format, etc., and may be provided separately to the client for use in client-based applications.

The system may be configured to present to a user 108 a derived document, such as a client-specific document, or form having active fields populated with data extracted from the source document. In one manner of use, the user 108 may have a hard copy of the source document at hand for comparing against the replicated or derivative version of the document on the screen as generated using the SDDE system. If the source document is in soft form, a separate screen may allow the user to visually compare the two electronic documents. In addition, the system may allow and respond to user input identifying the source document as a particular type of form or document. The user may also use the source document to compare against entries in a database or data populated in various forms generated by the SDDE using data extracted from the source document.

The SDDE system may include in a database a variety of forms, e.g., tax or regulatory forms and schedules for federal, state, local and other entities that require common information contained in source documents. In addition, a teaching algorithm or module may be included whereby users may scan and input forms with marked areas or markings delimiting fields in which data is to be extracted or for building a template for use by the SDDE system. A form identification sub-module may be used to call on the database of form templates or related data in comparing source documents against the database of forms or data to "match" the source document with a particular known form. This is similar to having a physical template form with cutouts therein to physically align with fields of a document being compared to see if they match. Given that entities, such as the IRS and other taxing authorities, issues forms and schedules of uniform layout and shape, the SDDE system can utilize this known form layout to more efficiently locate and identify data on source documents generated and based on such uniform forms.

The SDDE system may also operate in conjunction with a web-based portal, e.g., NetClient CS or UltraTax/1040 portal, to enable remote and online access. In this manner the SDDE can receive source documents from and distribute or present documents, including documents derived from source documents, to clients and third parties. The SDDE may also operate in conjunction with an electronic filing feature to permit filing of completed documents with entities, e.g., the IRS or other tax authority, by or on behalf of clients for whom the documents were prepared. The SDDE may operate in conjunction with known encryption or other secure transfer techniques to more securely facilitate data, document and filing exchanges and transactions.

Figure 2:
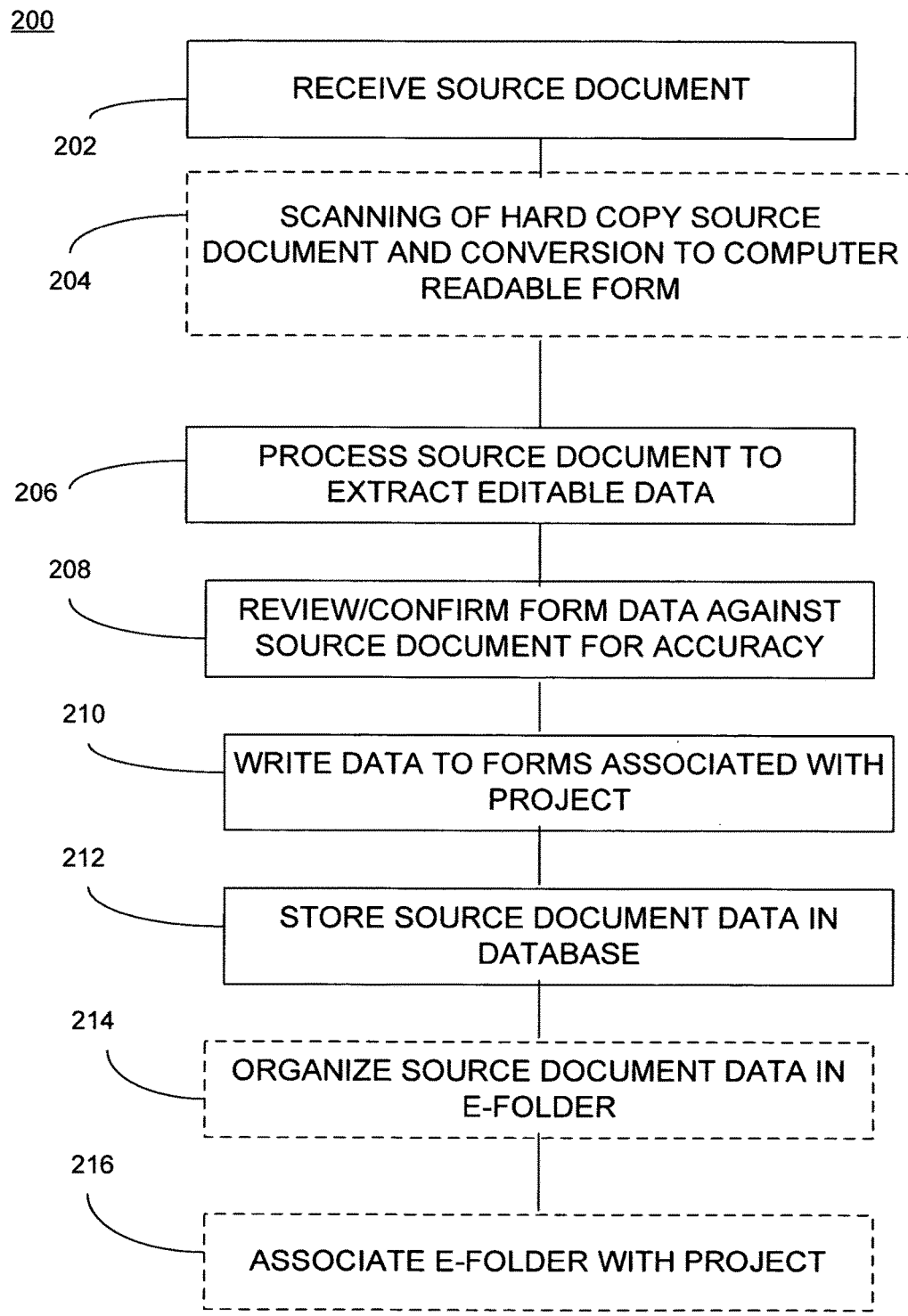
FIG. 2 shows a flowchart of the process of the present invention.

FIG. 2 is a flowchart illustrating an exemplary embodiment of the SDDE that provides a computer-implemented process 200 for facilitating source document data entry and derivative form generation. The process 200 includes the step 202 of receiving a source document, such as a tax return or associated schedules or forms, e.g., W-2, 1099, 1098, 1120, etc. While particular examples of forms are referenced herein for purposes of explanation and not limitation, the invention may be used for a broad array of forms. For example, references to IRS issued tax related schedules and forms are exemplary only and shall include all forms and schedules published by the IRS including via the address www.irs.gov/formspubs/lists. The source document may be received in either hard or soft form, as shown in the optional step 204, but if in hard copy must be converted to an electronic representation for further processing. At step 206 the source document, or its electronic representation, is processed, such as by an OCR or other interpretive process and as described above using templates and the like, to locate, identify and extract editable data. At step 208, the SDDE process includes extracting editable and usable data from the source document. The data extracted in Step 208 may be used at step 210 to write data to electronic forms to create derivative documents, such as tax returns and schedules, for a client associated with the source document, for example.

Source documents, derivative documents, data records, e-folders, etc. as used with the SDDE system may be associated with or identified with a client identification number such as a social security number, name and address, firm assigned identifier, etc. In addition or in the alternative, the extracted data may be stored in a database or other storage platform at Step 212 for further use, such as for later generating derivative documents by populating fields in electronic forms. In this manner, source document data stored from prior years may be used in subsequent year derivative documents also. Optionally, the process may include at Step 214 the use of electronic folders and organizing and storing source and or derivative documents in e-folders, which at Step 216 may be associated with clients or projects for ease of access. The process 200 may be performed in a variety and combination of environments and architectures, including network/Internet/WWW-based applications, desktop applications, and WWW-enabled applications.

The source documents to be processed by the SDDE and potentially stored within an associated database may be uploaded or forwarded by any person having access to the system, such as, for example, by a recognized client or taxpayer, a professional service provider employee, and may be received in a variety of ways, such as, for example, via hardcopy or electronic copy. The electronic copy of a source document may be received through a variety of electronic means of submission, such as, for example, the use of e-mail, facsimile, or posting via an electronic portal service such as UltraTax web portal. Source documents received as hardcopy from a client are converted into electronic copy via electronically scanning such source documents and converting them into a computer-readable format such as a portable source document format (.pdf), a word processor format (.doc, .wpd), a tagged image file format (.tif), a hypertext markup language (.html), a simple text format (.txt), a rich text format (.rtf), or any other such computer-readable electronic format.

Figure 3:
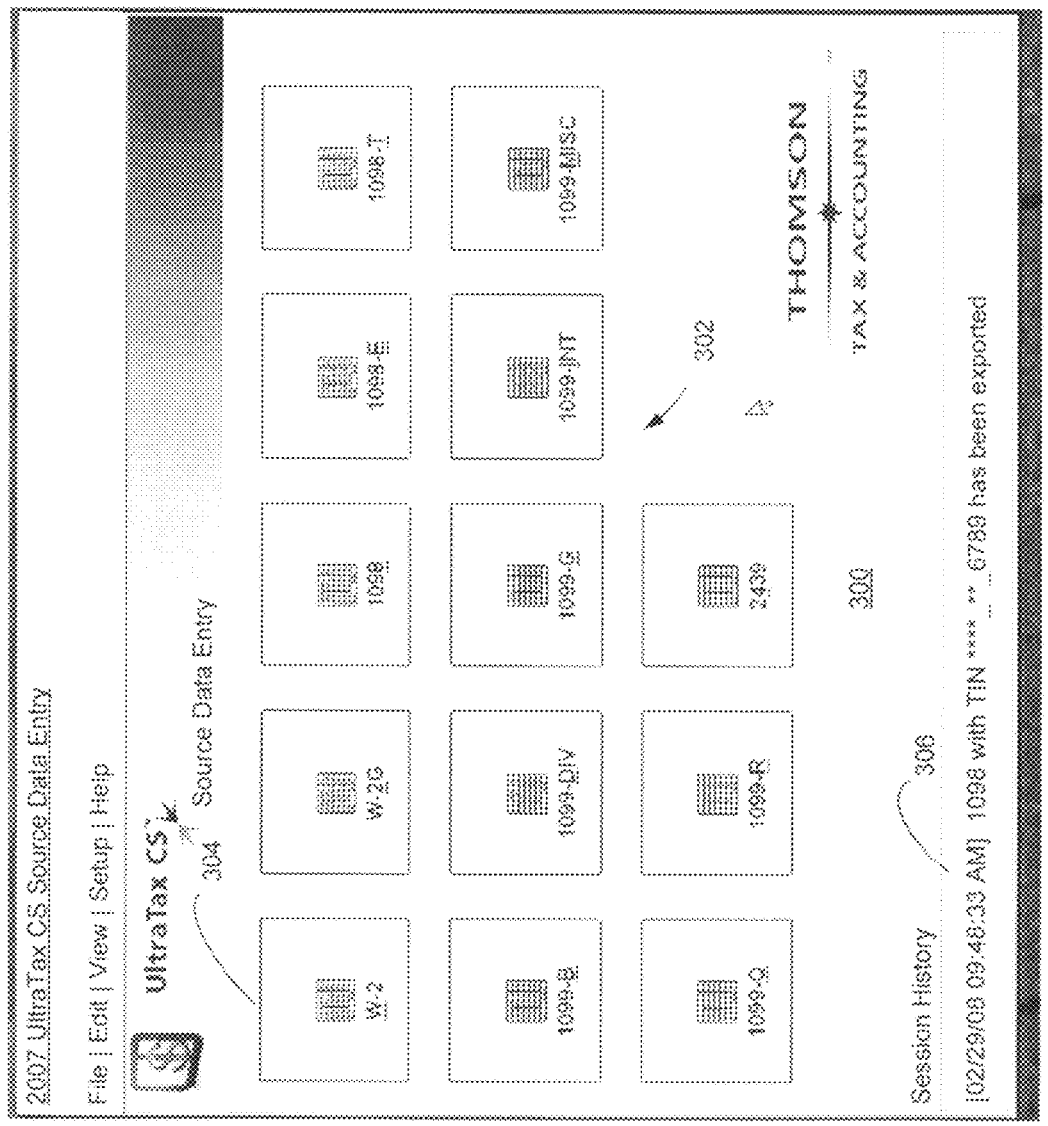
FIG. 3 shows a set of exemplary source documents.

The SDDE provides an interface, such as a graphical user interface ("GUI"), for presenting to the user the functional software which compiles and processes the information. In a preferred embodiment, a form interface screen 300, as shown in FIG. 3, may be presented to a user, for example in conjunction with a provider software solution such as Ultra-Tax CS solution. As shown in FIG. 3, a set or series of form selections are presented to the user in the form of active buttons 302. The forms illustrated are a subset of tax-related documents and are exemplary only, including W-2, W-2G, 1098, 1098-E, 1098-T, 1099-B, 1099-DIV, 1099-G, 1099-INT, 1099-MISC, 1099-Q, 1099-R, and 2439. In operation, for example, a user may select any one of the active buttons, such as the W-2 button 304. As shown in screen 300, a reference to the particular user, such as a taxpayer, may be included as shown at reference 306 that may include identifying information, such as all or a portion of a client or taxpayer identification number. As shown, a partial social security number associated with a 1098 document during a particular session is included on the screen. Also, as indicated in this exemplary screen 300, the "1098" is shown as having been "exported."

Upon selecting a form, the software launches a routine to present a blank W-2 form, a pre-populated W-2 form, or a separate data entry window or screen that may include data extracted from a source document. The button may also be used to identify a source document as being one of the forms included on the screen of FIG. 3. The SDDE may include software and data to take the form identification input and apply a routine to recognize areas of the form, such as a W-2 form, and to then associate data or text extracted in those areas as being particular types of data or information. This may be done in conjunction with an optical character recognition ("OCR") or other image interpretive capability, wherein the user may associate particular source documents with particular parts of a form, and the computer reads the text out of the source documents and formats the data into a form such as a W-2 form.

Figure 4:
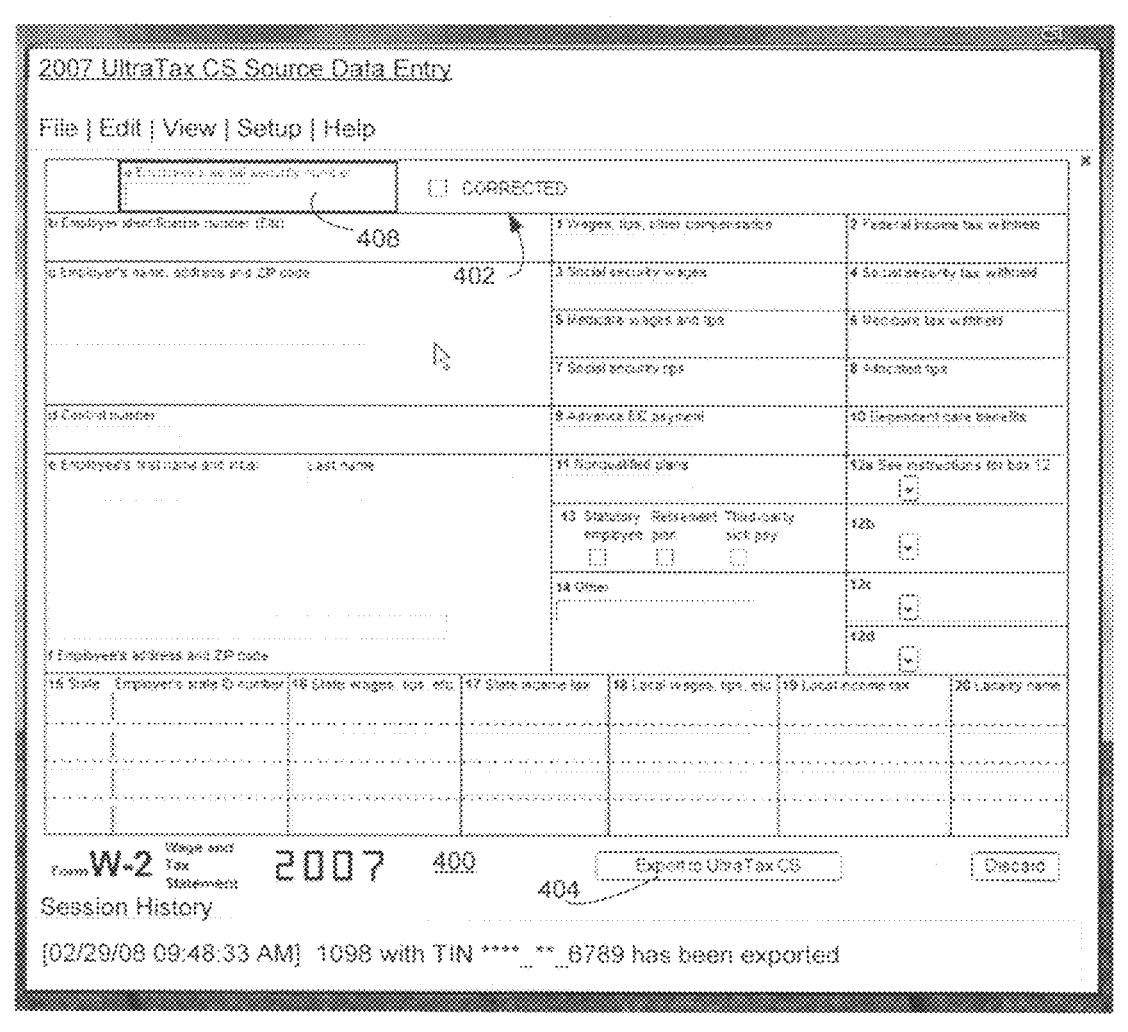

The GUI screen of FIG. 3 may generate a screen representing an unfilled, incomplete data entry form, for instance one that represents a standard reporting form such as a W-2 tax form. An example of such a screen/form is shown at FIG. 4. In the alternative, the SDDE system may automatically pre-populate fields of the form of FIG. 4 with data extracted from a source document. FIG. 4 illustrates a W-2 (wage and tax statement) form 400 with an array of blank fields. The layout and presentation of the electronic W-2 form is preferably designed to replicate the layout of the standard government W-2 form. Client data extracted from one or more source documents may be used to populate the fields of the form and a user may refer to a hard or soft copy of the source document to confirm and/or supplement information contained on the source document for accurate incorporation into a derivative document. Highly sensitive information, such as a client's social security number 408, may be grayed out or obscured so that even authorized users do not have access to the data. The SDDE may pre-populate the derivative form or upon some action of the user. Also, a field may be provided to give an indication if a user has confirmed or corrected data included in the derivative form, such as by "corrected" box 402. Once the data has been confirmed, the user may select button 404 and export the data and derivative document to an application and/or database, e.g., UltraTax CS.

The SDDE may present populated fields for review by the user to ensure that all records were accurately imported and that no errors or omissions exist within the populated forms. The storage and retrieval of information may be provided in a semi-permanent written fixation of such data within fields and the data may be accessed in subsequent views for further review. Alternatively, the data could be written and stored in a transient fashion whereby the form used in reviewing the data is erased once the session has been closed, but that through the use of shortcuts, subsequent users may view the form with the fields compiled despite no permanent written fixation of the source document. This embodiment provides for a "lighter" application and load time of such forms.

Figure 5:
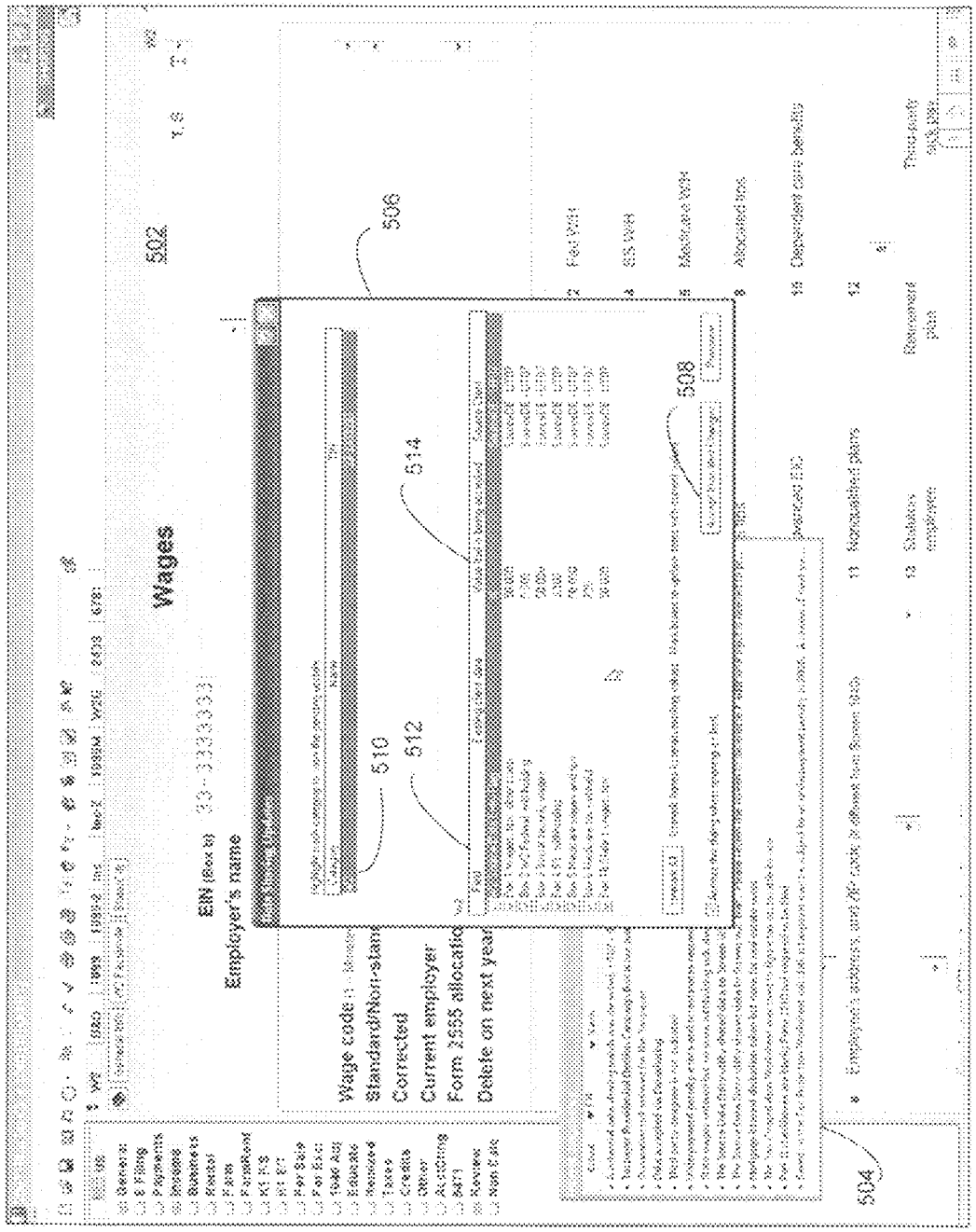
FIG. 5 shows an alternative view of the source data entry interface.

As shown in FIG. 5, a screen shot includes a Wages income screen 502 and separate diagnostics window 504 and data sharing update window 506. In this configuration, the GUI provides update window 506 that allows a user to select a category 510, e.g., W2, to view pending updates of fields 512 of client data related to that category. As shown, for example, the window 506 includes numeric values 514 associated with the respective fields 512 for consideration by the user. A user may refer to a source document to confirm the accuracy of the information included in the window 506 and for potential incorporation into a derivative document, such as represented by screen 502 and subsequent screen 600 in FIG. 6. The user may select some, none or all of the fields and may accept the indicated changes. Diagnostics window 504 provides a list of items associated with the data or record for consideration by the user.

Figure 6:
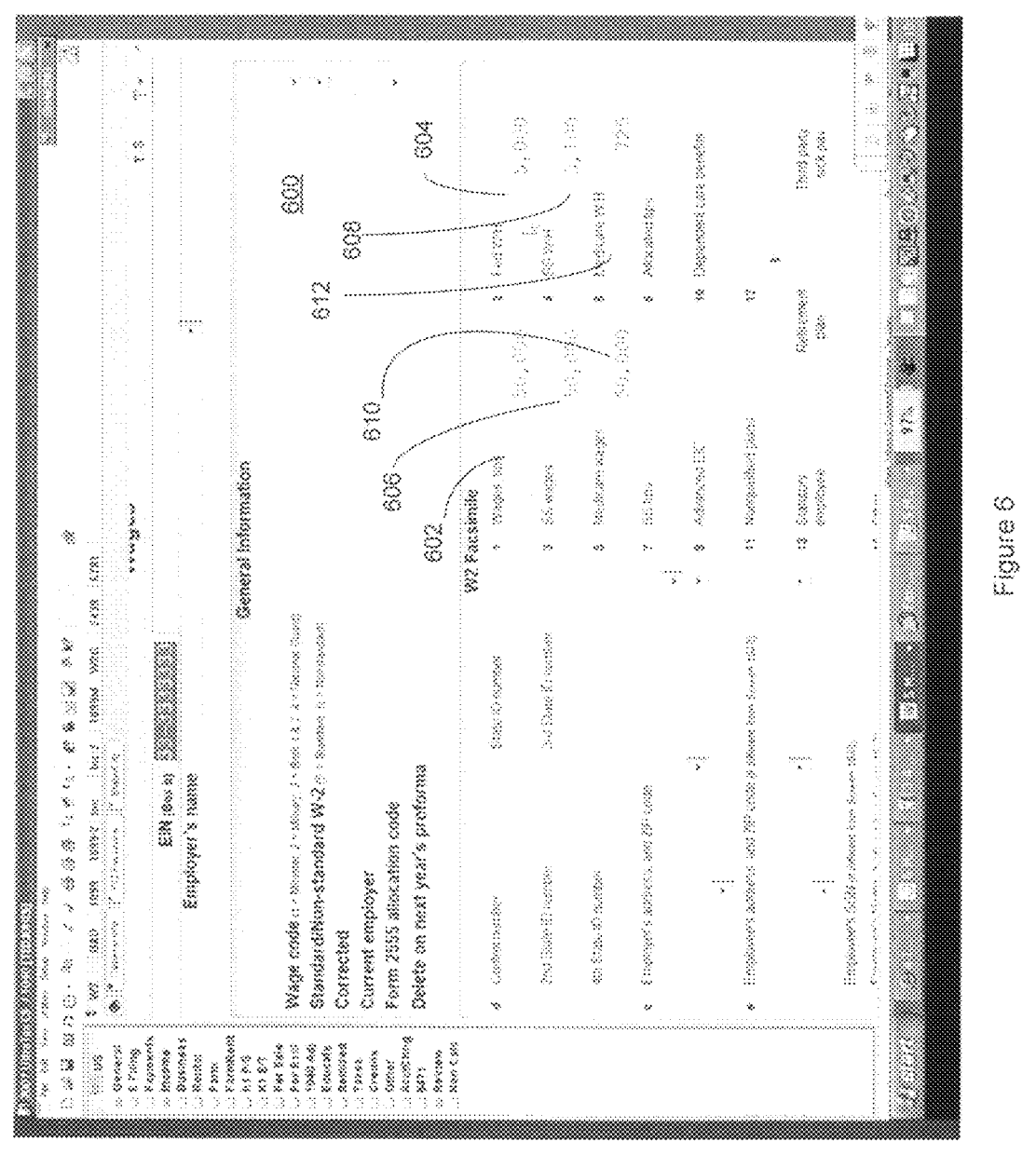

Once the user selects the fields 512 and clicks on the "Accept Indicated Changes" button 508, the values 514 associated with the fields 512 selected are used to populate the fields of the electronic form or document 600, as shown in FIG. 6. The resulting derivative document represented by screen 600 includes the numeric values 514 for Boxes 1 (Wages, tips) 602, 2 (Fed W/H) 604, 3 (SS wages) 606, 4 (SS W/H) 608, 5 (Medicare wages) 610, and 6 (Medicare W/H) 612. The employer identification number (EIN) may also be included at Box b.

Optionally, the SDDE may also provide for storage of electronic source documents in one or more databases using an e-folder system, or the like, and may be associated with a given project, such as, for example, a financial audit or tax return. E-folders may be associated with a project by a user when a new project file is created. The e-folders stored on a database may be remotely accessible via a network connection. The e-folders may include a primary folder as well as sub-e-folders similarly associated with the project. A new project may be created when a user has been assigned the task of creating a document such as, for example, a W-2 or audit report. The e-folders may be linked to the project in a manner such that when a project is reviewed, only those e-folders associated with the project are accessible to the user. Association between an e-folder and a project may be established by directly inputting a unique reference number to create a unique connection between the e-folder and the project, such as, for example, the matter number for the project or a client's social security number (SSN) or other identification number or set of characters.

The source documents stored within a database may be inputted by any authorized person and in a variety of ways, such as, for example, via hardcopy or electronic copy submitted by the client. The electronic copy of any source document may be received through any electronic means of submission, such as, for example, the use of e-mail, facsimile, or via an electronic portal service such as, for example, NetClient or UltraTax portal. Source documents received as hardcopy from a client are converted into electronic copy via electronically scanning such source documents and converting the document into a computer-readable format such as a portable source document format (.pdf), a wordprocessor format (.doc, .wpd), a tagged image file format (.tif), a hypertext markup language (.html), a simple text format (.txt), a rich text format (.rtf), or any other such computer-readable electronic format.

Source documents may be constructively located to e-folders through the use of placeholder files known as kernel pointers, or shortcuts which, when engaged directly by a user or indirectly by the SDDE, will retrieve the actual electronic source document for use by the software application. This allows the source document to be associated with multiple projects without a need for containing multiple copies of such source documents. Alternatively, source documents may be constructively placed into an e-folder through the use of associated tags. In this embodiment, a document can have attributed to it certain tags, such as, for example, project number or SSN, and such tags can be grouped into e-folders. The tag may consist of a stagnant or standard tag, or such tag may be a smart tag. A standard tag may use a two-way pointer between the source document and the e-folder that is fixed and specifically inputted by a user by assigning a tag to the source document, then creating an e-folder that collects all source documents with the same or similar tags. The tag may alternatively be a smart tag wherein such tags are not manually inputted by a user, but rather information from the source document is read into a processing element within the SDDE, and assigned to such source documents, and effectuating bidirectional linking pointers to be collected by the e-folders.

Constructive placement of a source document into an e-folder permits any particular source document to be associated with multiple projects without a need for containing multiple source documents minimizing storage requirement.

In contrast, the use of shortcuts provides only nominally additive space to the hard-drive or server while effectuating the equivalent of storing a single source document in a multitude of locations.

In one method of positioning data from e-folders to correct fields within a desired form, the SDDE may provide an additional software mapping component that functions as a system for mapping certain portions of source documents to certain fields within a form. For example, tick marks or source document positioning may be used for mapping previously identified and standard relevant information. For example, data provided within a first line of a submitted source document may be designated to be placed in field 1, whereas data provided within a second line of a submitted source document is to be placed in field 2, and so on. Also, the SDDE may include code adapted to allow a user to input information and group data from e-folders such that the source documents within the e-folders can become associated with distinct and particularized portions of a given form or derivative document being prepared in response to the assigned project, such as, for example, a W-2 or an audit report. At the user interface of the SDDE, the user may simply input the information collected from the source documents stored within the e-folders by using an interface having the appearance of an IRS form, such as, for example, a standard paper format used by nonprofessionals.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A computer-implemented method for collecting and entering data from a source document, the method comprising:
    a. collecting electronic source data associated with a source document, the source document being a non-marked up document having no electronic tags or electronic identifiers, and further comprising, converting the source document into an electronic representation of the source document and automatically extracting by a computer comprising a processor source data from the electronic representation of the source document;
    b. generating a data record and associating the data record with a client;
    c. automatically identifying by the computer a document type by comparing the electronic representation of the source document to a data table of document form templates, and automatically identifying a first set of extracted source data as being of a first data type based in part on a physical location of the electronic source data within the electronic representation of the source document;
    d. storing the identified document type and the first set of extracted source data including the identified first data type in the data record;
    e. automatically selecting an electronic form from a set of electronic forms based at least in part on the identified document type and associating the first set of extracted source data with a field of the electronic form based at least in part on the identified first data type;
    f. generating by the processor a user interface representing a client-specific document and comprising a set of user interface elements including at least one user interface element corresponding to a field of the electronic form with collected source data associated with that field in the associating step; and
    g. organizing at least one of the collected electronic source data, the source document, the client-specific document and the selected electronic form into an electronic folder by associating the at least one of the collected electronic source data, the source document, the client-specific document and the selected electronic form with one or more tags, associating the folder with a project identifier, and by associating the at least one of the collected electronic source data, the source document, the client-specific document and the selected electronic form with the electronic folder by a placeholder document.

2. The method of claim 1, further comprising associating the source document with the client-specific document.

3. The method of claim 1, wherein the client-specific document is one of a group consisting of a tax return, a tax return-related schedule, a tax related attachment, and a quarterly payment document.

4. The method of claim 3, further comprising finalizing the client-specific document and submitting the client-specific document to a tax authority.

5. The method of claim 1, further comprising comparing the source document with the collected source data to confirm the accuracy of the collected source data.

6. The method of claim 5, wherein the comparing step is used to confirm the accuracy of fields of the client-specific document populated with collected source data.

7. The method of claim 1, wherein the source document is one of a group consisting of: W-2 type tax forms; 1098 type tax forms; 1099 type tax forms; 1120 type tax forms; 2439 type tax forms; IRS issued tax related schedules and forms; and state or local issued tax related forms.

8. The method of claim 1, further comprising:
    storing the collected source data and a set of electronic forms in a database; and
    generating the client-specific document by populating a set of fields within the electronic form with a set of collected source data.

9. The method of claim 1, further comprising:
    determining based on the location of the collected source data on the source document which fields to respectively associate with the collected source data.

10. The method of claim 1, further comprising:
    assigning a set of field type reference data based on location of a set of fields on a standard form issued by a tax authority, wherein the associating step comprises associating a set of collected source data with the set of field type reference data.

11. The method of claim 1, further comprising organizing at least one of the collected electronic data, the source document, and the associated documents into an electronic folder and associating the folder with a project identifier.

12. The method of claim 1, further comprising presenting the client-specific form to a user for review.

13. A computer-based system for collecting and entering data from a source document into an electronic form document, the system comprising:
 a. a computer having a memory, storage and a processor for executing source document data entry software to generate a client-specific document, the software comprising:
 b. code adapted to convert the source document into an electronic representation of the source document and adapted to extract electronic source data from the electronic representation of the source document, the source document being a non-marked up document having no electronic tags or electronic identifiers;
 c. code adapted to generate a data record and associate the data record with a client;
 d. code adapted to automatically identify a document type by comparing the electronic representation of the source document to a data table of document form templates, and automatically identify a first set of extracted electronic source data as being of a first data type based in part on a physical location of the electronic source data within the electronic representation of the source document;
 e. code adapted to store the identified document type and the first set of extracted electronic source data including the first identified data type in the data record;
 f. code adapted to automatically select an electronic form from a set of electronic forms based at least in part on the identified document type and associate the first set of extracted electronic source data with one or more fields comprising the electronic form document based at least in part on the identified first data type;
 g. code adapted to generate a user interface representing a client-specific document and comprising a set of user interface elements including at least one user interface element corresponding to a field of the electronic document with the extracted electronic source data associated with the field; and
 h. code adapted to organize at least one of the collected electronic source data, the source document, the client-specific document and the selected electronic form into an electronic folder by associating the at least one of the collected electronic source data, the source document, the client-specific document and the selected electronic form with one or more tags, associating the folder with a project identifier, and by associating the at least one of the collected electronic source data, the source document, the client-specific document and the selected electronic form with the electronic folder by a placeholder document.

14. The system of claim 13, wherein the software further comprises code adapted to associate the source document with the client-specific document.

15. The system of claim 13, wherein the client-specific document is one of a group consisting of a tax return, a tax return related schedule, a tax related attachment, and a quarterly payment document.

16. The system of claim 15, wherein the system further comprises an electronic filing module adapted to electronically file the client-specific document with a tax authority.

17. The system of claim 13, wherein the software further comprises code adapted to electronically extract source data from the source document.

18. The system of claim 13 further comprising automatically comparing the source document with the collected source data to determine accuracy.

19. The system of claim 13 further comprising automatically comparing the collected source data with the client-specific document to determine accuracy.

20. The system of claim 13, wherein the source document is one of a group consisting of: W-2 type tax forms; 1098 type tax forms; 1099 type tax forms; 1120 type tax forms; 2493 type tax forms; IRS issued tax related schedules and forms; and state or local issued tax related forms.

21. The system of claim 13 further comprising a database for storing the collected source data and a set of electronic forms, wherein each of the set of electronic forms comprises a set of fields and the client-specific document is generated by populating a set of fields associated with an electronic form with a set of the collected source data.

22. The system of claim 13 further comprising code adapted to determine based on the location of the collected source data on the source document which fields to respectively associate with the collected source data.

23. The system of claim 13 further comprising code adapted to assign a set of field type reference data based on location of a set of fields on a standard form issued by a tax authority, and code adapted to associate a set of collected source data with the set of field type reference data.

24. The system of claim 13 further comprising an electronic folder associated with a project for organizing at least one of: the collected source data, the source document, and the client-specific document.

25. The system of claim 13 further comprising a GUI adapted to present to a user the collected source data and to allow editing of the collected source data to correct errors, inconsistencies or omissions.

26. A computer program for collecting and entering data from a source document into an electronic form document and embodied in a computer-readable medium configured for execution on a computer having an associated memory, display, and input device, the computer program comprising:
 a. code adapted to convert the source document into an electronic representation of the source document and adapted to extract electronic source data from the electronic representation of the source document, the source document being a non-marked up document having no electronic tags or electronic identifiers;
 b. code adapted to generate a data record and associate the data record with a client;
 c. code adapted to identify a document type by comparing the electronic representation of the source document to a data table of document form templates, and automatically identifying a first set of extracted electronic source data as being of a first data type based in part on a physical location of the electronic source data within the electronic representation of the source document;
 d. code adapted to store identified document type and the first set of extracted electronic source data including the first identified data type in the data record;
 e. code adapted to automatically select an electronic form from a set of electronic forms based at least in part on the identified document type and associate the first set of extracted electronic source data with one or more fields comprising the electronic form document based at least in part on the identified first data type;
 f. code adapted to generate a user interface representing a client-specific document and comprising a set of user interface elements including at least one user interface element corresponding to a field of the electronic document with the extracted electronic source data associated with the field; and g. code adapted to organize at least one of the collected electronic source data, the source document, the client-specific document and the selected electronic form into an electronic folder by associating the at least one of the collected electronic source data, the source document, the client-specific document and the selected electronic form with one or more tags, associating the folder with a project identifier, and by associating the at least one of the collected electronic source data, the source document, the client-specific document and the selected electronic form with the electronic folder by a placeholder document.

27. The computer program of claim 26, further comprising code adapted to associate the source document with the client-specific document.

28. The computer program of claim 26, further comprising an electronic filing module adapted to electronically file the client-specific document with a tax authority.

* * * * *